(12) United States Patent
Chari et al.

(10) Patent No.: US 10,419,224 B2
(45) Date of Patent: Sep. 17, 2019

(54) PREVENTING MONOCULTURE IN APPLICATION DISTRIBUTION

(71) Applicant: International Business Machines Corporation, Armonk, NY (US)

(72) Inventors: Suresh N. Chari, Tarrytown, NY (US); Ian M. Molloy, Chappaqua, NY (US); Wilfried Teiken, Ossing, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/181,908

(22) Filed: Jun. 14, 2016

(65) Prior Publication Data

US 2017/0359181 A1    Dec. 14, 2017

(51) Int. Cl.
*H04L 29/06* (2006.01)
*H04L 9/32* (2006.01)

(52) U.S. Cl.
CPC .......... *H04L 9/3247* (2013.01); *H04L 63/123* (2013.01)

(58) Field of Classification Search
CPC ............. G06F 21/54; G06F 2212/1052; G06F 2212/402; G06F 3/0619; H04L 9/002; H04L 9/3247
See application file for complete search history.

(56) References Cited

U.S. PATENT DOCUMENTS

| | | | | |
|---|---|---|---|---|
| 8,489,868 B2* | 7/2013 | Yach | ...................... | G06F 21/121 |
| | | | | 711/100 |
| 2003/0023856 A1* | 1/2003 | Horne | .................. | G06F 11/3624 |
| | | | | 713/187 |
| 2007/0277038 A1* | 11/2007 | Hardy | ...................... | G06F 21/51 |
| | | | | 713/176 |
| 2014/0298401 A1 | 2/2014 | Batson et al. | | |
| 2014/0366080 A1 | 12/2014 | Gupta et al. | | |
| 2015/0047049 A1* | 2/2015 | Panchenko | ............. | G06F 21/54 |
| | | | | 726/26 |
| 2015/0199515 A1 | 7/2015 | Qureshi | | |
| 2017/0257219 A1* | 9/2017 | Yi | ....................... | G06F 9/30036 |

OTHER PUBLICATIONS

Pappas—2015 NPL.*
Vasileios Pappas, "Defending Against Return-Oriented Programming", Columbia University, (2015), (127 pages).
Pappas, et al., "Smashing the Gadgets: Hindering Return-Oriented Programming Using In-Place Code Randomization", (2012), (15 pages).

* cited by examiner

*Primary Examiner* — Tri M Tran
(74) *Attorney, Agent, or Firm* — Harrington & Smith

(57) ABSTRACT

Portions of code in an original application are randomized to generate a randomized version of the original application, wherein the randomizing does not modify expected behavior of the original application. Digital signature(s) are generated that attest to integrity of the randomized version. The digital signature(s) and either the original application or the randomized version are sent to a user device for execution or denial of execution of the randomized version based on the digital signature(s). At the user device, the randomized version is created if not received. The randomized version of the application is verified by the user device using the digital signature(s). The randomized version is executed by the user device in response to the digital signature(s) being verified or not executing the randomized version in response to the digital signature(s) not being verified.

24 Claims, 10 Drawing Sheets

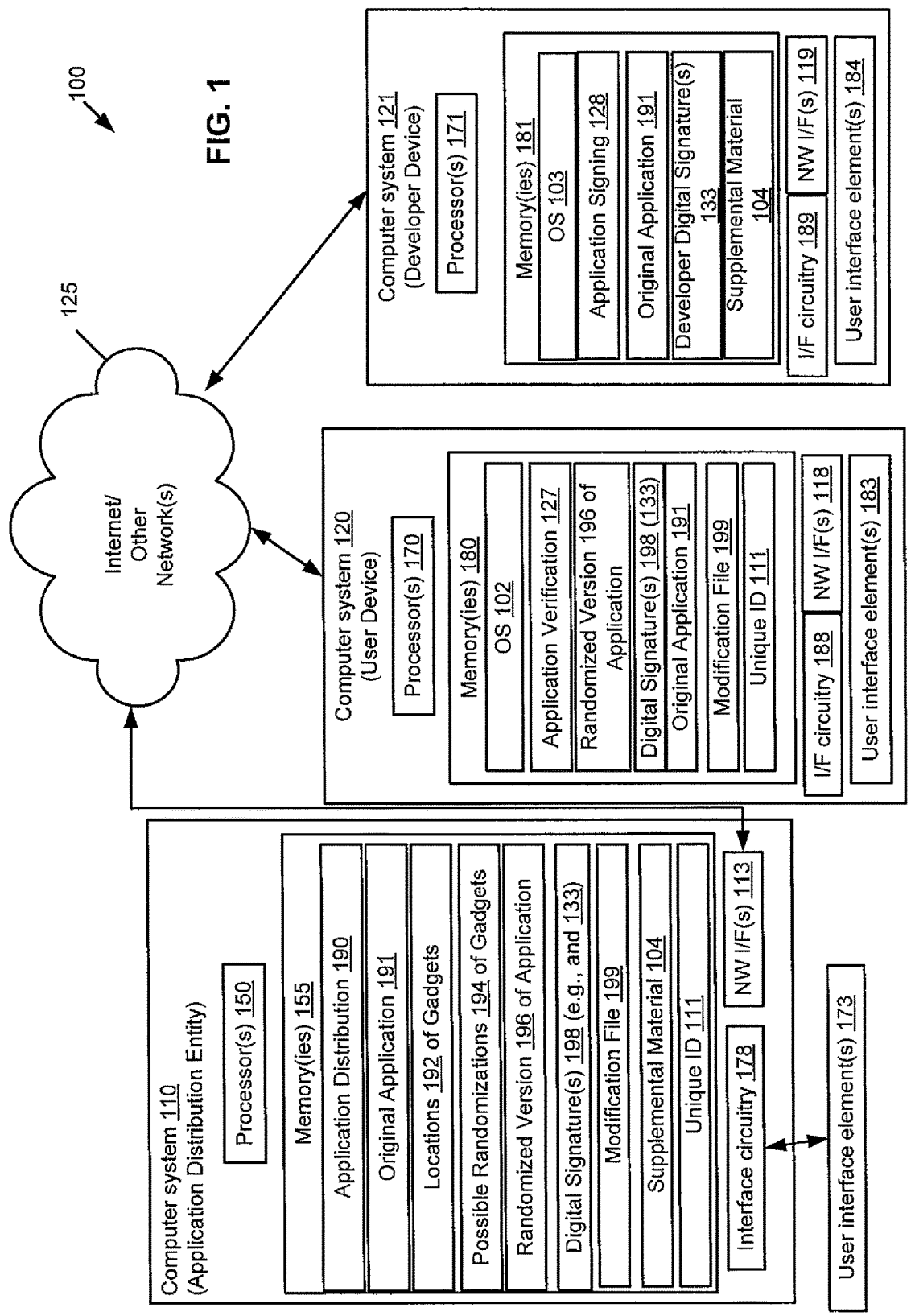

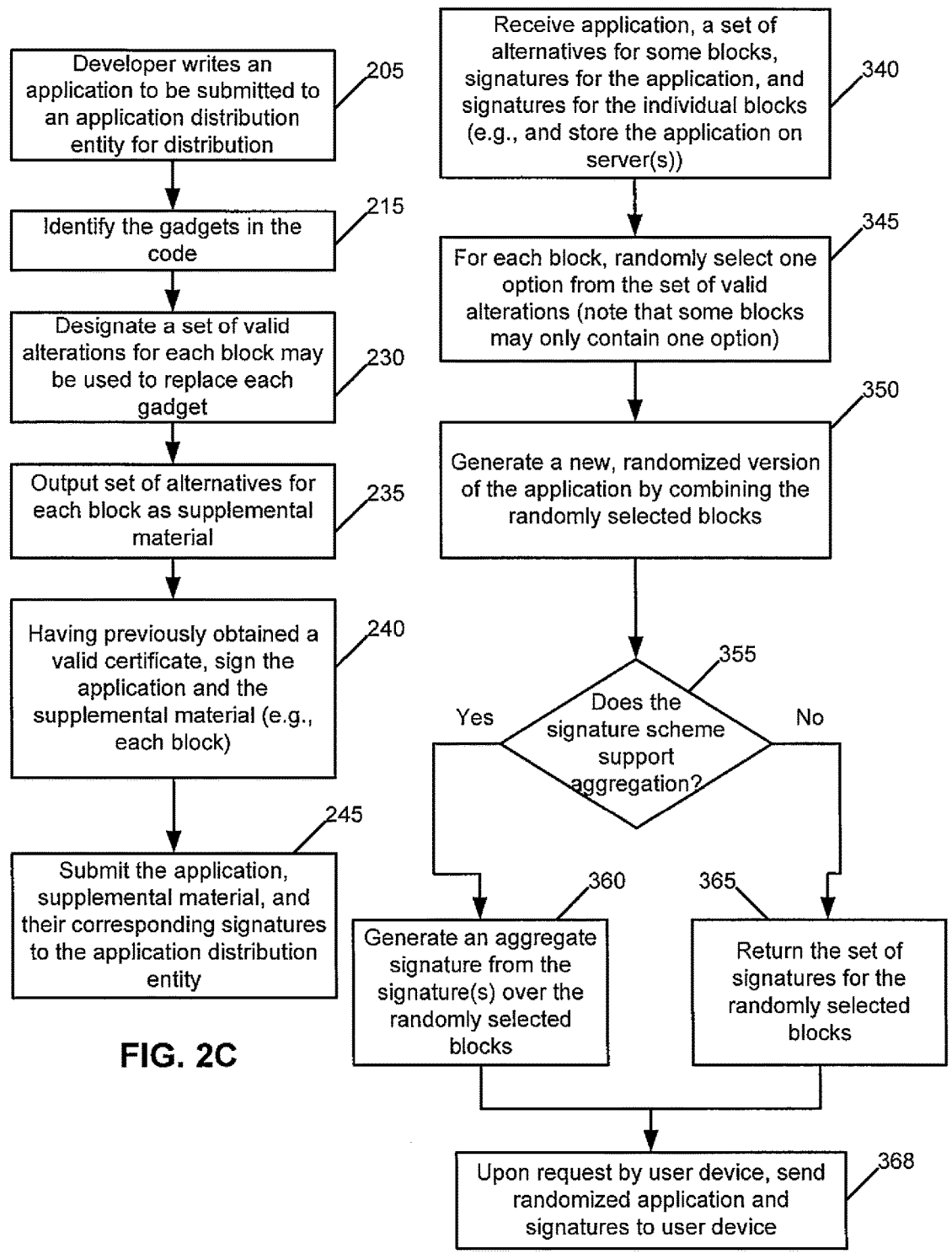

PREVENTING MONOCULTURE IN APPLICATION DISTRIBUTION

BACKGROUND

The present invention relates to distribution of applications, and more particularly to improving security using such application distribution.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Recent trends show that vulnerabilities in third party software are quickly outpacing vulnerabilities in software from primary vendors or in operating systems. These vulnerabilities can easily be exploited by adversaries to take control of a user device, perform unwanted actions on behalf of the user, or leak or otherwise compromise sensitive information.

To compound this problem, there has been proliferation in third-party distributors of applications. These third-party distributors are also markets, or "App Stores", and these make finding and installing third party software easy for end users. For example, the Apple Store and Android Play markets have allowed end users to install applications from thousands of small and relatively unknown developers on millions of end devices.

When an end user installs an application, the end user is providing the application the ability to run code on the end user's device, and possibly access a wide variety of sensors. Trust in the third party applications is crucial, especially as more end users begin to perform banking, online trading, and other high-value or sensitive operations on these devices, and as such devices begin to be adopted by businesses as supplements or replacements for traditional laptop and desktop computers.

Currently, the end user must trust the developers to not perform malicious actions. The authenticity of an application is often verified through the use of a digital signature. This, however, does not guarantee the application does not contain malicious code or vulnerabilities that can be exploited. Some App Stores, such as the iTunes/iOS AppStore run by Apple, requires the owner (Apple in this example) to vet each submission, potentially limiting the malicious applications that are accepted. Similarly, Google employs a process called Bouncer (basically, an antivirus/antimalware scanner) to analyze applications for malicious behavior.

A stealthy developer may be able to exploit a vulnerability, either intentionally or accidentally, to execute arbitrary code on the device, possibly using an attack known as return oriented programming (ROP). In ROP, existing benign code snippets are chained together such that behavior was not intended or desired by the end user or original developer is performed. While some solutions to prevent ROP exist, they are either computationally intensive or do not work in an environment such as iOS and Android, where applications are digitally signed and whose signature must be valid before an application can be executed.

SUMMARY

This section is intended to include examples and is not intended to be limiting.

An exemplary embodiment is a method that comprises randomizing by a computer system portions of code in an original application to generate a randomized version of the original application, wherein the randomizing does not modify expected behavior of the original application. The method comprises generating by the computer system one or more digital signatures that attest to integrity of the randomized version of the original application. The method also comprises sending by the computer system the one or more digital signatures and either the original application or the randomized version of the original application to a user device for execution or denial of execution of the randomized version of the original application based on the one or more digital signatures.

An exemplary apparatus includes one or more processors and one or more memories including computer program code. The one or more memories and the computer program code are configured to, with the one or more processors, cause the apparatus to perform at least the following: randomizing by a computer system portions of code in an original application to generate a randomized version of the original application, wherein the randomizing does not modify expected behavior of the original application; generating by the computer system one or more digital signatures that attest to integrity of the randomized version of the original application; and sending by the computer system the one or more digital signatures and either the original application or the randomized version of the original application to a user device for execution or denial of execution of the randomized version of the original application based on the one or more digital signatures.

In a further exemplary embodiment, a computer program product is disclosed. The computer program product comprises a computer readable storage medium having program instructions embodied therewith, the program instructions executable by a computer system to cause the computer system to perform at least the following: randomizing by a computer system portions of code in an original application to generate a randomized version of the original application, wherein the randomizing does not modify expected behavior of the original application; generating by the computer system one or more digital signatures that attest to integrity of the randomized version of the original application; and sending by the computer system the one or more digital signatures and either the original application or the randomized version of the original application to a user device for execution or denial of execution of the randomized version of the original application based on the one or more digital signatures.

In a further exemplary embodiment, a method is disclosed that comprises receiving by a computer system one of an original application or a randomized version of the original application and one or more digital signatures corresponding to the randomized version of the original application, wherein the one or more digital signatures corresponding to the randomized version of the original application ostensibly attest to integrity of the randomized version of the original application. The method includes creating, in response to the randomized version of the original application not being received, the randomized version of the original application. The method further includes verifying, by the computer system and by using the one or more digital signatures, the randomized version of the application. The method additionally includes executing by the computer system the randomized version of the original application in response to the one or more digital signatures being verified or not executing the randomized version of the original application in response to the one or more digital signatures not being verified.

An exemplary apparatus includes one or more processors and one or more memories including computer program code. The one or more memories and the computer program code are configured to, with the one or more processors, cause the apparatus to perform at least the following: receiving by a computer system one of an original application or a randomized version of the original application and one or more digital signatures corresponding to the randomized version of the original application, wherein the one or more digital signatures corresponding to the randomized version of the original application ostensibly attest to integrity of the randomized version of the original application; creating, in response to the randomized version of the original application not being received, the randomized version of the original application; verifying, by the computer system and by using the one or more digital signatures, the randomized version of the application; and executing by the computer system the randomized version of the original application in response to the one or more digital signatures being verified or not executing the randomized version of the original application in response to the one or more digital signatures not being verified.

In a further exemplary embodiment, a computer program product is disclosed. The computer program product comprises a computer readable storage medium having program instructions embodied therewith, the program instructions executable by a computer system to cause the computer system to perform at least the following: receiving by a computer system one of an original application or a randomized version of the original application and one or more digital signatures corresponding to the randomized version of the original application, wherein the one or more digital signatures corresponding to the randomized version of the original application ostensibly attest to integrity of the randomized version of the original application; creating, in response to the randomized version of the original application not being received, the randomized version of the original application; verifying, by the computer system and by using the one or more digital signatures, the randomized version of the application; and executing by the computer system the randomized version of the original application in response to the one or more digital signatures being verified or not executing the randomized version of the original application in response to the one or more digital signatures not being verified.

BRIEF DESCRIPTION OF THE SEVERAL VIEWS OF THE DRAWINGS

FIG. 1 illustrates an exemplary system used for preventing monoculture in application distribution in an exemplary embodiment;

FIGS. 2A, 2B, and 2C, 3A, 3B, 3C, and 3D, and 4A, 4B, 4C, and 4D are logic flow diagrams for preventing monoculture in application distribution, and illustrate the operation of exemplary methods, results of execution of computer program instructions embodied on a computer readable memory, functions performed by logic implemented in hardware, and/or interconnected means for performing functions in accordance with exemplary embodiments, where FIGS. 2A, 2B, and 2C illustrate actions performed by a developer and developer device, where FIGS. 3A, 3B, 3C, and 3D illustrate actions performed by an application distribution entity, where FIGS. 4A, 4B, 4C, and 4D illustrate actions taken by a device of a user, where FIGS. 2A, 3A, and 4A correspond to one scenario, where FIGS. 2B, 3B, and 4B correspond to a second scenario, where FIGS. 2C, 3C, and 4C correspond to a third scenario, and where FIGS. 3D and 4D correspond to examples allowing an application distribution entity or user device, respectively, to operate using the different scenarios in FIG. 3A-3C or 4A-4C, respectively;

DETAILED DESCRIPTION

Figures 2A, 3A:
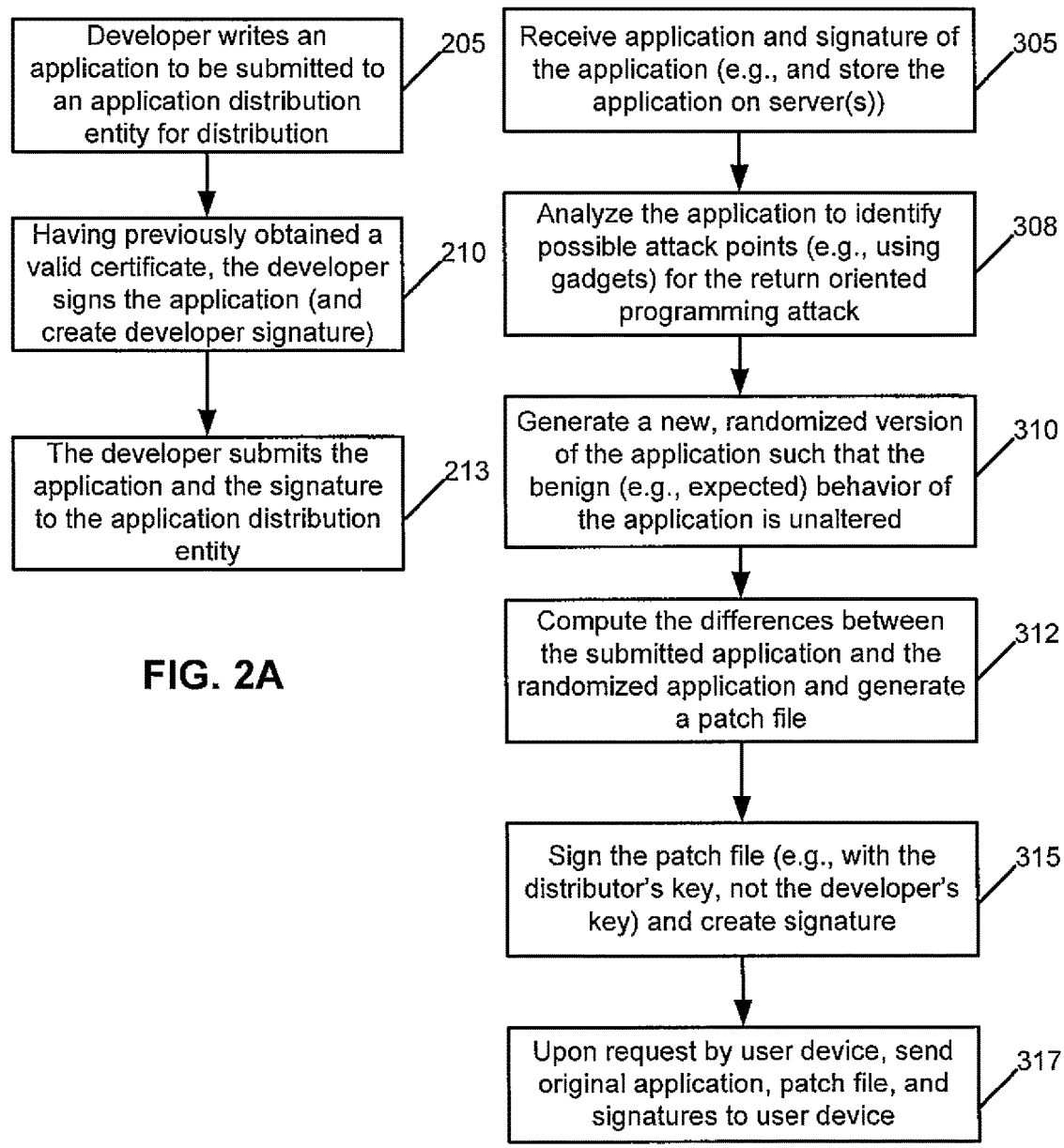

The word "exemplary" is used herein to mean "serving as an example, instance, or illustration," Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, there may be vulnerabilities, such as return oriented programming, in distributed applications. Exemplary embodiments herein seek to improve security in the distribution of applications. For instance, exemplary embodiments may break up what is known as a monoculture by, e.g., introducing randomized executables that are unique when delivered to each end user while maintaining the digital signature to attest to their integrity and originality with the developer.

By exploiting the structure of the App Stores, each end user may be provided with a unique copy of an application, along with a digital certificate from the developer (and possibly the distributor or the store) that attests to the application's integrity. If the application is "leaked" or provided over the Internet to other users to download, the uniqueness of the application can be used to identify the account of the culprit user and to take action against such user. For instance, imagine there are n gadgets identified in the code that can be randomized, and for each gadget there are only two possible choices. A gadget is a portion of software code, typically performing some function. More specifically, a gadget may be a set of instruction sequences ending with a "ret" (e.g., return) instruction. The set may only contain a few instructions and perform a limited function, such as reading data from memory into a register or performing a computation such as adding two numbers. For the example where there are n gadgets identified in the code that can be randomized, there are $2^n$ possible applications that can be distributed to the end users. Given n sufficiently large, each user can easily be provided a unique version of the application. This can further be combined with watermarking techniques to make identifying the leaking user more robust. Further, because each application instance is unique, an ROP attack will likely have to be custom written for each end user or device. Since an adversary cannot know the exact randomized version installed on each end device, producing a valid attack becomes costly. This prevents a single attack from being able to impact many devices and spread rapidly.

More detailed description of exemplary embodiments is presented after an exemplary system is introduced in reference to FIG. 1.

Turning to FIG. 1, this figure illustrates an exemplary system 100 used for personalized content selection for preventing monoculture in application distribution in an exemplary embodiment. FIG. 1 illustrates one possible example and there are many others. The system 100 comprises the computer systems 110, 120, and 121, which communicate via the network(s) 125. The network 125 could be or include a local area network (LAN), a wide area network (WAN), the Internet, or the "cloud". The computer system 110 is a computer system that is an application distribution entity (and will also be referred to as application distribution entity 110). Such an entity distributes applications and is commonly called an "App store", although these have various names. The computer system 120 is a user device, which users use to download and execute applications (commonly called "apps"). The computer system 120 will also be referred to as a user device 120. A user is a human being that uses the user device. The computer system 121 is a developer device (and will be referred to also as developer device 121). A developer is a human being who creates an application to be distributed by the application distribution entity 110. Note that only one application distribution entity 110, user device 120, and developer device 121 are shown, although this is merely for ease of reference.

The computer system 110 comprises one or multiple processors 150, one or more multiple memories 155, interface circuitry 178, and one or more network (N/W) interfaces (I/F(s)) 113. The computer system 110 may include or be connected to one or more user interface elements 173, or not have such elements. The one or more memories 155 comprise an application distribution module 190, an original application 191, locations 192 of gadgets, possible randomizations 194 of gadgets, a randomized version 196 of an application 191, a modification file 199, digital signature(s) 198 (and possibly signature(s) 133), supplemental material 104, and/or unique identification (ID) 111, depending on implementation. The randomized version 196 of the application 191 will also be referred to below as a randomized application 196. In brief, the application distribution entity 110, e.g., under control at least in part of the application distribution module 190, may create a randomized version 196 of an application from the original application 191, e.g., to prevent monoculture in application distribution. In another example, the application distribution entity 110 uses the original application 191 and creates a modification file 199 that is used by the user device 120 (along with the original application 191) to create a randomized version 196 of the application 191. The locations 192 of gadgets and possible randomizations 194 of gadgets are used in an exemplary embodiment to generate the randomized version 196 of the application 191. The locations 192 of the gadgets may include, e.g., locations such as byte offsets within an executable and also a number of bytes of code that correspond to each corresponding gadget. It is noted that this can be performed via combined executable code, but one could easily apply the techniques to source code (randomizing layout, optimizations, code generation, etc.), or the intermediate representation (IR) of the parsed source code prior to being translated into machine code. Some compilers will turn the source code into IR code and apply optimization there. The final action of turning the IR into executable code is platform specific (x86, POWER, ARM, etc.), and it is at that stage where the gadgets are generated and one could easily optimize the generation of code to randomize the gadgets.

The digital signature 198 is used to verify to a user device 120 that the randomized version of the application 196 is a correct version. The unique ID 111 is a unique identifier of the user or the user device 120, and the use of the unique ID 111 is described in more detail below. Depending on implementation, the supplemental material 104 is (or is not) generated by the developer and/or developer device 121. The supplemental material 104 can be a mask such as a bitmask that is used to designate gadgets in the original application 191 to be used by the application distribution entity 110 to create the randomized version 196 of the application. In another example, the supplemental material 104 is a set of alternatives for blocks, where the set is used by the application distribution entity 110 to create the randomized version 196 of the application.

The application distribution module 190 comprises functionality as described herein and comprises computer-readable code that, when executed by the one or more processors 150, cause the computer system 110 to perform the functionality described herein. The application distribution module 190 may also be implemented (in part or completely) as hardware, such as being internal to the one or more processors 150. The computer system 110 is also referred to as a personalized content server 110 herein, although it should be clear that a personalized content server is also a computer system. It is also noted that a "computer system" as this term is used herein may include multiple processors and memories, e.g., in a cloud-based system.

The computer system 110 may or may not have user interface elements 173, which could include a display, keyboard, mouse, and the like. A server, depending on implementation, may only be accessed remotely (e.g., via a network interface 113), and as such would not use the interface elements 173.

The computer system 120 comprises one or multiple processors 170, one or more multiple memories 180, interface circuitry 188, one or more network (N/W) interfaces (I/F(s)) 118, and one or more user interface elements 183. Although primary emphasis is placed herein on the computer systems 120 being mobile, wireless devices, this is not necessary. The computer systems 120 can be such mobile, wireless devices (e.g., smartphones, tablets, portable computers) or can be "fixed" computer systems such as personal computers, televisions, and the like. The computer systems 120 are also referred to herein as user devises 120, although each such user device is a computer system. The user devices 120 may include or be connected to the one or more user interface elements 183. The one or more memories 180 may comprise some or all of an operating system (OS) 102, an application verification module 127, the randomized version 196 of the application 191, a digital signature 198 (and possibly signature(s) 133), the original application 191, a modification file 199 and/or a unique ID 111, depending on implementation. The OS 102 is a collection of software that directs a computer's operations, controlling and scheduling the execution of other programs, and managing storage, input/output, and communication resources. Note that the application distribution entity 110 will likely have an OS also, but this is not shown. The application verification module 127 (which may also be integrated into the OS 102) verifies the randomized version of the application 196 using the digital signature 198, e.g., prior to the point when the OS 102 executes the application 196. Another embodiment uses the original application 191 and a modification file 199 that is used by the user device 120 to create a randomized version 196 of an application. These embodiments are described in more detail below. The application verification module 127 comprises functionality as described herein and comprises computer-readable code that, when executed by the one or more processors 170, cause the computer system 120 to perform the functionality described herein. The application verification module 127 may also be implemented (in part or completely) as hardware, such as being internal to the one or more processors 170.

The user interface element(s) 183 of the user device 120 could be one or more of, e.g., a touch screen, wireless keyboard, motion sensors, mice, trackballs, and the like. In the example of a mobile, wireless user device 120, the user interface elements 183 would typically include a touch screen.

The computer system 121 is a system used by a developer, and typically will not be a mobile, wireless device, but could be. The following are all assumed to be similar: the one or more processors 171, 170; the one or more memories 181, 180; the I/p circuitry 189, 188; the one or more NW I/Fs 119, 118; and the one or more user interface elements 184, 183. The one or more memories 181 include an OS 103, an application signing module 128, an original application 191, a developer digital signature (or signatures) 133 and possibly supplemental material 104. The developer has developed the original application 191, and will be uploaded to the application distribution entity 110. The application signing module 128 allows the developer to sign the original application 191 and comprises functionality as described herein and comprises computer-readable code that, when executed by the one or more processors 171, cause the computer system 121 to perform the functionality described herein. The application signing module 128 may also be implemented (in part or completely) as hardware, such as being internal to the one or more processors 171.

The computer readable memories 155, 180, and 181 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memories 155, 180, and 181 may be means for performing storage functions. The processors 150, 170, and 171 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processors 150, 170, and 171 may be means for performing functions, such as controlling the computer systems 110, 120, and 121 respectively, and other functions as described herein.

The network interfaces 113, 118, and 119 may be wired and/or wireless and communicate over the Internet/other network(s) 125 via any communication technique. The user interface elements 173, 183, and 184 may include, for instance, one or more of keyboards, mice, trackballs, displays (e.g., touch screen or non-touch screen), and the like. The computer systems 110, 120, and 121 may be, e.g., personal computer systems, laptops, wireless devices such as smartphones and tablets, and "computer systems" formed in the cloud from multiple processors and memories.

Exemplary possible processes for preventing monoculture in application distribution will now be described in reference to FIGS. 2A-2C, 3A-3D, and 4A-4D. These figures are logic flow diagrams for preventing monoculture in application distribution, and illustrate the operation of exemplary methods, results of execution of computer program instructions embodied on a computer readable memory, functions performed by logic implemented in hardware, and/or interconnected means for performing functions in accordance with exemplary embodiments.

Figure 4D:
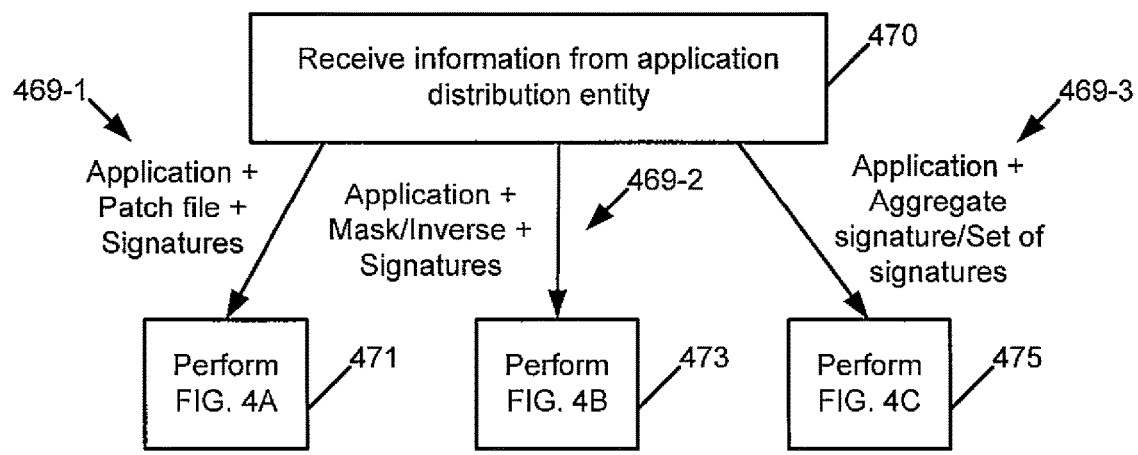
Figure 4A:
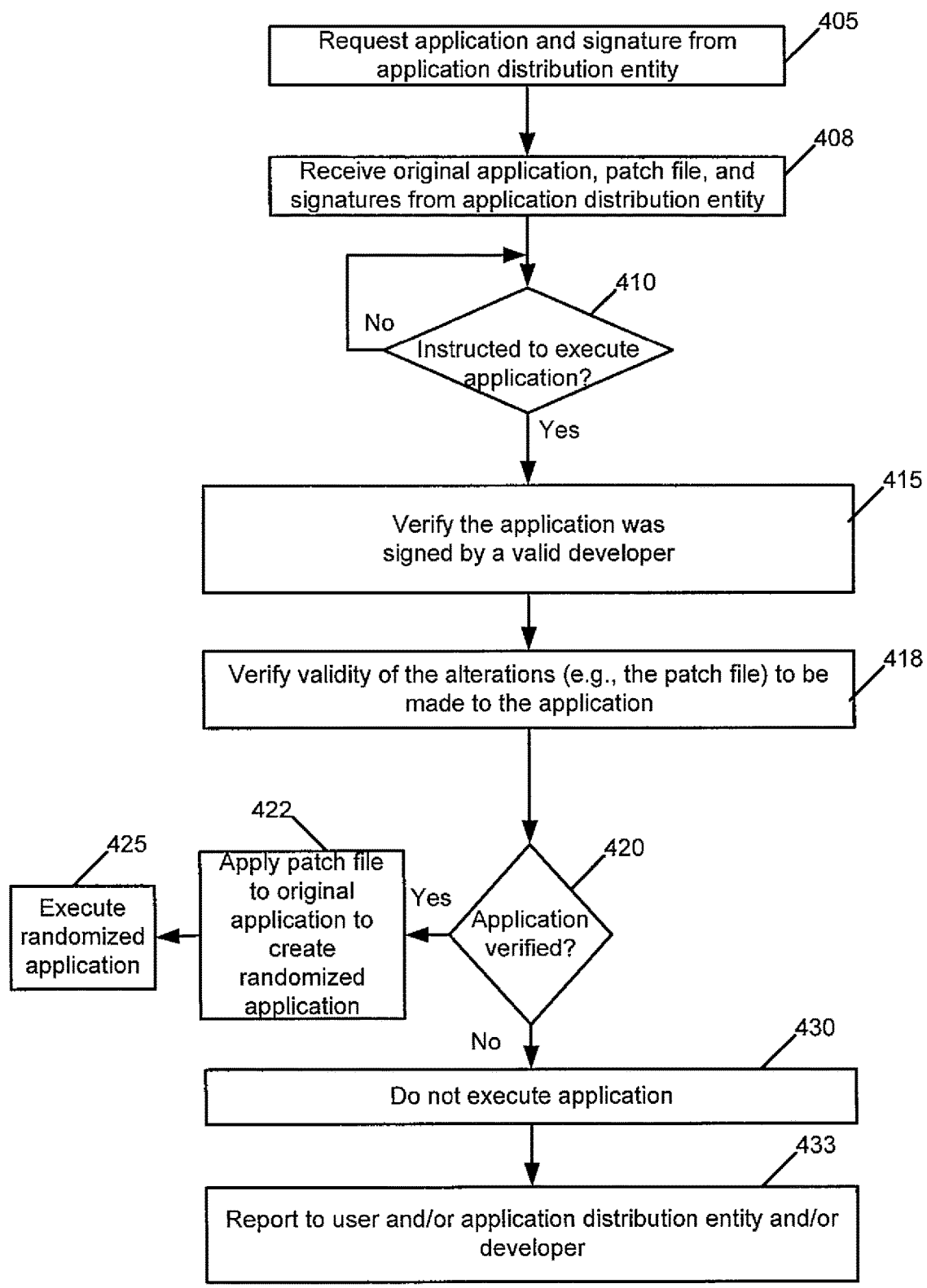

As described above, exemplary embodiments may break up what is known as a monoculture by, e.g., introducing randomized executables that are unique when delivered to each end user while maintaining the digital signature to attest to their integrity and originality with the developer. For a developer of an application ("app"), there are a number of different options provided to the developer. For instance, a developer may choose to simply submit his or her app (as original application 191) to the application distribution entity 110, without making any recommendations as to which blocks of code in the original application 191 can be modified or how those blocks can be modified. FIG. 2A illustrates this scenario from the perspective of the developer and his or her device 121, and FIGS. 3A and 4A illustrate the same scenario from the perspectives of the application distribution entity 110 and user device 120, respectively.

Figures 2B, 3B:
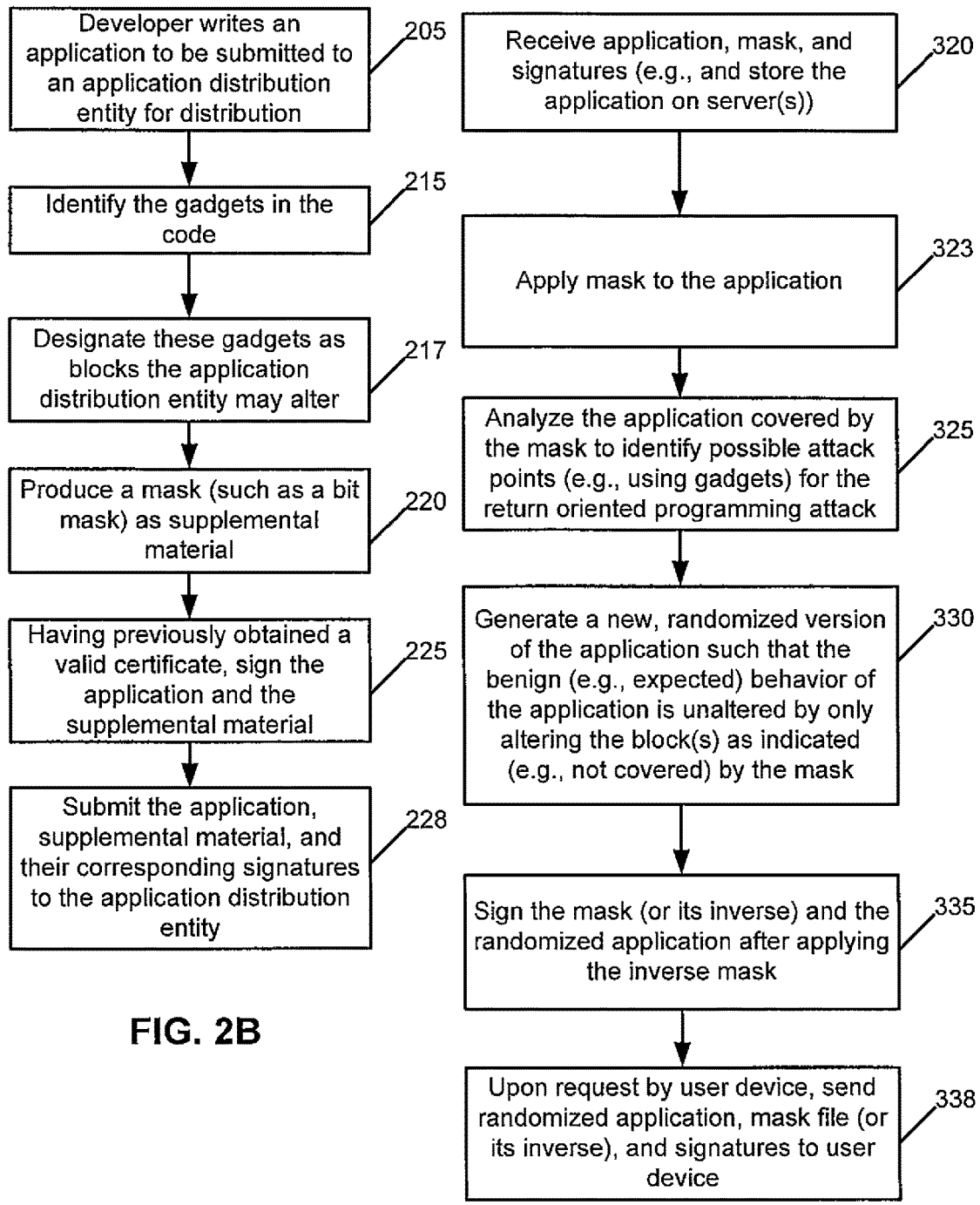
Figure 4B:
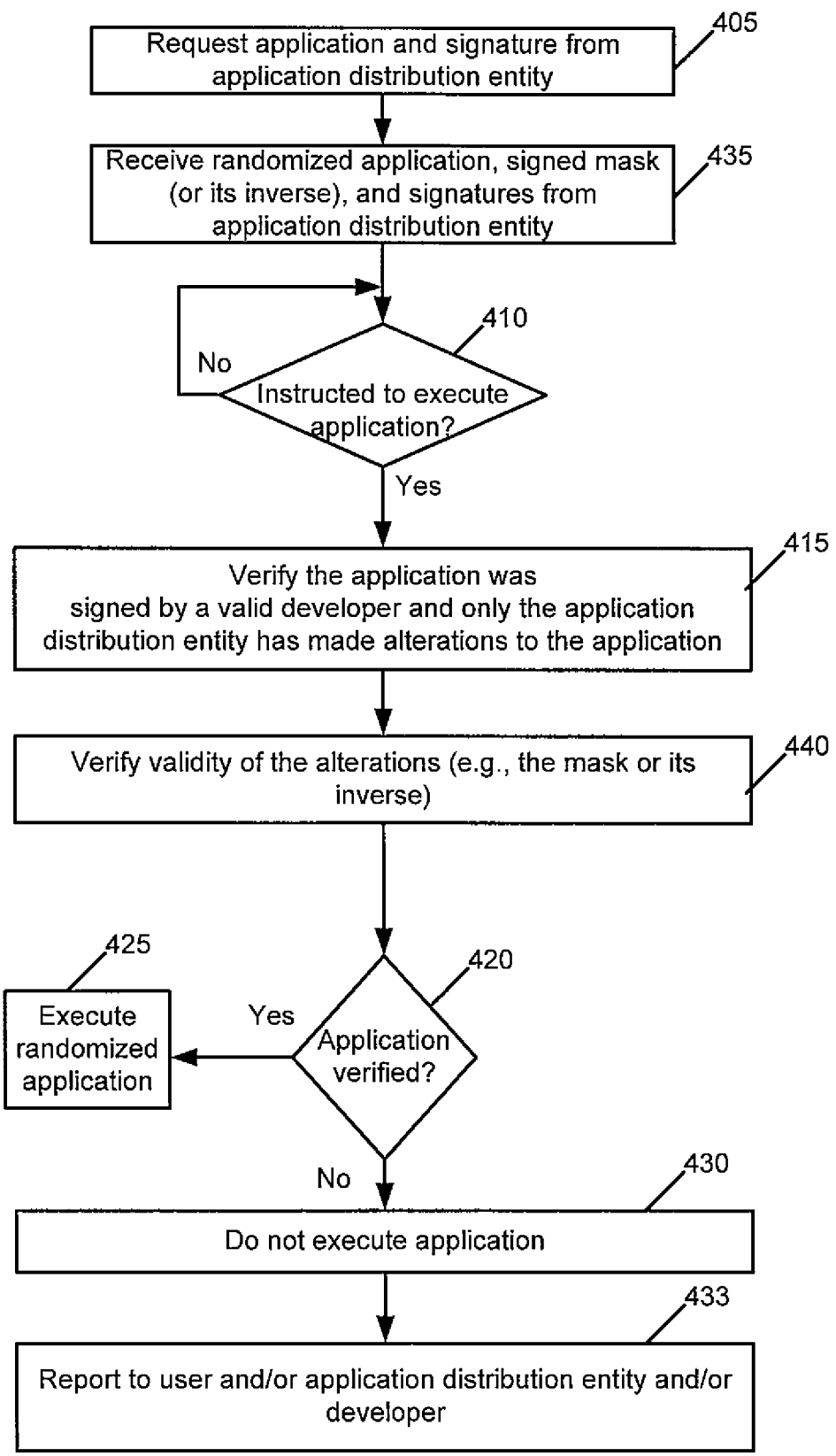

As another example, the developer may choose to have more control over which blocks of code in the original application 191 can be modified. FIG. 2B illustrates one such example where the developer designates gadgets and their corresponding blocks using a mask. FIGS. 3B and 4B illustrate the same scenario from the perspectives of the application distribution entity 110 and user device 120, respectively.

Figure 4C:
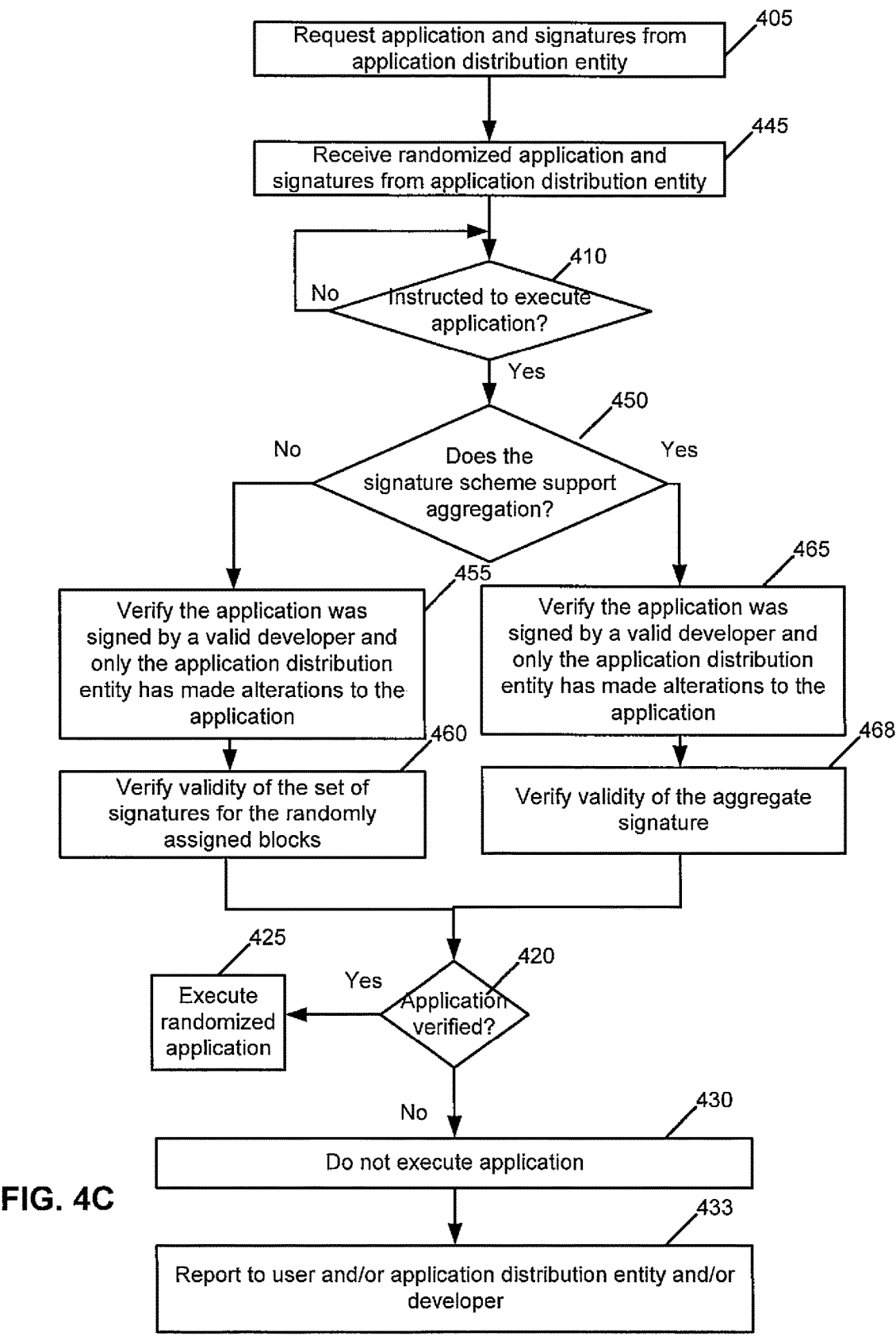

FIG. 2C illustrates another example where the developer designates gadgets, corresponding blocks of code, and a set of alternatives that may be used to replace the blocks. This scenario requires more participation by the developer but also gives the developer even more control (relative to FIG. 2B for instance) over how the developer's application is randomized. FIGS. 3C and 4C illustrate the same scenario from the perspectives of the application distribution entity 110 and user device 120, respectively.

Thus, FIGS. 2A to 2C illustrate varying levels of developer involvement, from no involvement (FIG. 2A), to a medium amount of involvement (FIG. 2B), and finally to a lot of involvement (FIG. 2C). These figures are only options and there may be other scenarios not shown, such as where the developer has even more involvement.

Figure 3D:
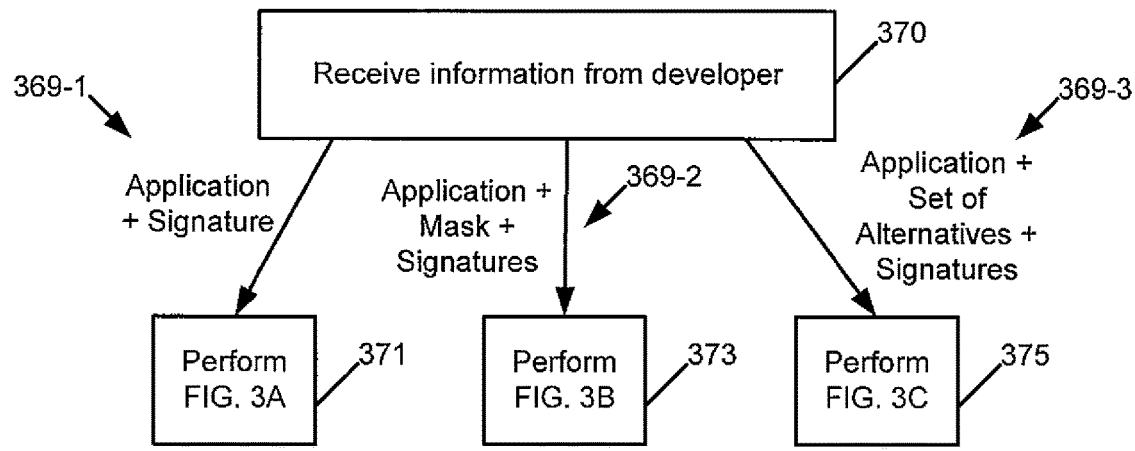

As illustrated by the examples in FIGS. 2A-2C (with corresponding examples in FIGS. 3A-3C and 4A-4C, respectively), the developer may have some amount of control over his or her application and how that application is randomized. An application distribution entity 110 may require one of these scenarios to be used. Alternatively, the application distribution entity 110 may allow two or all three of these scenarios to be used by developers. FIG. 3D assumes that the application distribution entity 110 allows all three scenarios to occur, and the application distribution entity 110 chooses between the different scenarios based on what is received from a developer. Similarly, the user device 120 may require one of these scenarios to be used or may allow two or more of these scenarios to be used. FIG. 4D assumes that the user device 120 allows all three scenarios to occur, and the user device 120 chooses between these scenarios based on what is received from the application distribution entity 110.

The blocks in FIGS. 2A, 2B, and 2C are assumed to be performed by a developer and the developer device 121

(e.g., under control at least in part by the OS 103). The blocks in FIGS. 3A-3D are assumed to be performed by the application distribution entity 110, e.g., under control at least in part by the application distribution module 190. The blocks in FIGS. 4A-4D are assumed to be performed by the user device 120, e.g., under control at least in part by the application verification module 127.

Turning to FIG. 2A, in block 205, a developer writes an application 191 to be submitted to an application distribution entity 110 for distribution. In block 210, having previously obtained a valid certificate, the developer signs the application 191 and, e.g., creates the signature 133. In block 213, the developer submits the application 191 and the signature 133 to the application distribution entity 190. As can be seen, this flow requires very little on the part of the developer in terms of what the developer has to do, but also provides no control by the developer over the randomization of the developer's application 191.

FIG. 3A corresponds to FIG. 2A and illustrates actions performed by the application distribution entity 110. In block 305, the application distribution entity 110 receives the application 191 and the signature 133 of the application. The application distribution entity 110 may store the application on one or more server(s) (e.g., other computer systems similar to computer system 110). In block 308, the application distribution entity 110 analyzes the application 191 to identify possible attack points (e.g., using gadgets) for the return oriented programming attack (e.g., and potentially other attacks).

The application distribution entity 110 in block 310 generates a new, randomized version 196 of the application 191 such that the benign (e.g., expected) behavior of the application 191 is unaltered. It is noted that there could be a change in the function of a gadget (for example, creating invalid machine code) but not in the overall function of the application. This is possible because a gadget may begin in the middle of a benign instruction in the program, and thus the gadget code is never executed by the program to achieve the desired functionality. That is, we are changing the unintended functionality, e.g., something that would never have been executed. On a related note, stripping "dead code", that is code that is never executed, could also be a form of hardening and prevents other attacks. It is also noted that locations and possible randomizations of the portions of code that could be attacked may be stored for later creation of a new, randomized version of the original application.

For possible techniques for performing blocks 308 and 310, see the following: Vasilis Pappas et al., "Smashing the Gadgets: Hindering Return-Oriented Programming Using In-Place Code Randomization", SP '12 Proceedings of the 2012 IEEE Symposium on Security and Privacy, Pages 601-615 (2012); and Vasileios Pappas, "Defending against Return-Oriented Programming", Doctoral Thesis, Columbia University (2015). See also the examples provided in reference to FIG. 5, described below.

In block 312, the application distribution entity 110 computes the differences between the submitted application 191 and the randomized application 196 and generates a patch file. The patch file is illustrated in FIG. 1 as modification file 199, and the patch file lists necessary changes to the application 191 for the randomization. The patch file may also be called a "cliff" (or "differential") file. In block 315, the application distribution entity 110 signs the patch file (e.g., with the distributor's key, not the developer's key) and creates a signature 198. Note that it may be possible for the application distribution entity 110 to produce a unique version of the randomized application for distribution to each user. Additionally, the application distribution entity 110 may generate new, randomized versions in advance and simply select such a pre-generated version. For example, blocks 308-315 could be performed in advance and different patch files and signatures stored for recall at a later time. In block 317, upon request by the user device 120, the application distribution entity 110 sends the original application 191, patch file (e.g., modification file 199), and signatures 198 and 133 to the user device 120.

Referring to FIG. 4A, the figure corresponds to FIGS. 2A and 3A. In block 405, the user device 120 requests an application and signature from the application distribution entity 110. As is known, this is usually done by a user of the user device 120 directing the user device 120 to go to an app store and the user requesting downloading and installation of the application, which the user device 120 performs in cooperation with the application distribution entity 110. The user device 120 in block 408 receives the original application 191, patch file (e.g., modification file 199), and signatures 198, 133 from the application distribution entity 110. In block 410, the user device 120 determines whether it has been instructed to execute this application. If not (block 410=No), the flow proceeds to block 410. If so (block 410=Yes), the user device 120 in block 415 verifies the application 191 was signed by a valid developer (e.g., using the developer digital signature 133). In block 418, the user device 120 verifies validity of the alterations (e.g., the patch file) to be made to the application, e.g., by using the signature 198. Blocks 415 and 418 mean that an independent verification can be performed such that the end user knows the distributor only made (or will make) valid alterations to the application that cannot alter the application's behavior. This prevents the case where the application distribution entity 110 is malicious, and binds any execution errors to the developer, and not to the changes made by the application distribution entity 110.

In block 420, it is determined by the application distribution entity 110 if the application is verified by both of blocks 415 and 418. If the application is not verified (block 420=No), in block 430, the user device 120 does not execute the application and in block 433, the user device 120 may (e.g., optionally) report that the application is not verified to one or multiple ones of the following: the user and/or the application distribution entity 110 and/or the developer. The user device 120 in block 433 could send any additional information with the report, such as a copy of the application and signatures. It is further noted that the developer's certificate could be revoked, in which case the user device 120 will not verify the application (block 420=No) (and also in block 415, the application would not be verified).

By contrast, if the application is verified (block 420=Yes), in block 422, the user device 120 applies the patch file to the original application 191 to create the randomized application 196 (that is, the randomized version 196 of the original application 191). Note that receiving both the original application 191 and the patch file this allows verification of the original developer's signature. The other schemes with more advanced signature methods are designed to get around that sticking point. The user device 120 in block 425 executes the randomized application 196.

In an exemplary embodiment, when the application is to be executed, the developer's digital signature may be verified first, followed by the application distribution entity's list of changes (as incorporated into the patch file). If both are found to be correct, when the application is loaded into memory and the patch file (i.e., modification file 199) is applied. If the list of changes is bound to another end device or another user account (or App Store account) the end device can refuse to execute the application. What is meant by being bound to another end device or another user account is that the list of changes is signed for another device or account. Basically, a user device 120 would receive something signed from application distribution entity 110 that includes some unique identifier of the user device 120 or the user's account. This is illustrated by the unique ID 111 in FIG. 1. This binds the application 191 at a fine level of granularity to the end device and limits piracy. Thus, the verify operations in, e.g., block 418 can also take into account that the patch file may be bound to a different account or is bound to the correct account (corresponding to the user device 120 and/or user).

It is noted that block 415 and 418 are performed in response to an instruction to execute the application 191. However, these blocks could be performed after block 408 and before an instruction to execute the application 191, such as in response to the reception of the original application and other materials in block 408. If the application is not verified at this time (block 420=No), block 433 could be performed and the application could be marked (or even modified) to prevent execution, or deleted. If the application is verified at this time (block 420=Yes), the application could be marked to allow execution, or not deleted (e.g., all applications have been verified).

FIGS. 2A, 3A, and 4A just described illustrate a scenario where the developer provides no input for the randomization of his or her application. FIGS. 2B, 3B, and 4B illustrate another scenario, where the developer provides more input for the randomization of his or her application.

Turning to FIG. 2B, in block 205, a developer writes an application 191 to be submitted to the application distribution entity 110 for distribution. The developer in block 215 identifies the gadgets in the code of the application 191. For possible techniques for identifying gadgets, see the Vasilis Pappas references cited above. In block 217, the developer designates these gadgets as blocks the application distribution entity may alter. The developer in block 220 produces a: mask (such as a bitmask) as supplemental material. The mask is illustrated as the modification file 199 in FIG. 1. The mask is one way of marking which portions (e.g., gadgets) of the code in the application 191 may be altered by the application distribution entity 110. There are a few ways one could represent the mask. One could be the set of regions or bounds which should not be modified. Another way (how one might implement it in code) is a bitmask. So, for any memory address that should not be changed, the hex value 0xF, and for a value that can be changed (to almost anything) the hex value 0x0. Then, to apply the mask one takes the bitwise AND of the program with the mask to produce an output that contains only the regions that cannot be changed. Other versions are also possible.

In block 225, having previously obtained a valid certificate, the developer signs the application 191 and, e.g., creates a signature 133, and also signs the supplemental material (e.g., the mask) and creates another signature 133. The developer in block 225 needs to sign the application after the mask has been applied. Additional signatures (original application, the mask, etc.) can also be sent, but the masked application is required for user verification in blocks 415 and 440 of FIG. 4B. In block 228, the developer submits the application 191, the supplemental material, and the corresponding signatures 133 to the application distribution entity 190.

As can be seen, the flow from FIG. 2B requires more (relative to FIG. 2A) on the part of the developer in terms of what the developer has to do, but also provides additional control by the developer over the randomization of the developer's application 191.

FIG. 3B corresponds to FIG. 2B and illustrates actions performed by the application distribution entity 110. In block 320, the application distribution entity 110 receives the application 191, the mask, and the signatures 133. The application distribution entity 110 may store the application on one or more server(s). In block 323, the application distribution entity 110 applies the mask to the application 191. In block 325, the application distribution entity 110 analyzes the application 191 covered by the mask to identify possible attack points (e.g., using gadgets) for the return oriented programming attack (e.g., and potentially other attacks). The application distribution entity 110 in block 330 generates a new, randomized version of the application 191 such that the benign (e.g., expected) behavior of the application is unaltered by only altering the block(s) as indicated (e.g., not covered) by the mask. In block 335, the application distribution entity 110 signs the mask (or its inverse) and the randomized application 196 after applying an inverse mask, and this creates two signatures 198. In block 338, upon request by the user device 120, the application distribution entity 110 sends the randomized application 196, mask file (or its inverse) (e.g., modification file 199), and the signatures 198 to the user device 120.

Referring to FIG. 4B, the figure corresponds to FIGS. 2B and 3B. In block 405, the user device 120 requests an application and signature from the application distribution entity 110. As stated above, this is usually done by a user of the user device 120 directing the user device 120 to go to an app store and the user requesting downloading and installation of the application, which the user device 120 performs in coordination with the application distribution entity 110. The user device 120 in block 435 receives the randomized application 196, mask (or its inverse) (e.g., modification file 199), and signatures 198 from the application distribution entity 110. In block 410, the user device 120 determines whether it has been instructed to execute this application. If not (block 410=No), the flow proceeds to block 410. If so (block 410=Yes), the user device 120 in block 415 verifies the application 191 was signed by a valid developer (e.g., using the developer digital signature 133) and only the application distribution entity has made alterations to the application (e.g., using the digital signature 198). In block 440, the user device 120 verifies validity of the alterations (e.g., the mask or its inverse).

In block 420, it is determined by the application distribution entity 110 if the application is verified by both of blocks 415 and 440. If the application is not verified (block 420=No), blocks 430 and 433 are performed, as previously described. If the application is verified (block 420=Yes), in block 425, the user device 120 executes the randomized application 196.

It is noted that block 415 and 440 are performed in response to an instruction to execute the application 196. As described above with respect to blocks 415 and 518 of FIG. 4A, these blocks could be performed after block 408 and before an instruction to execute the application 196.

As previously described, FIGS. 2A, 3A, and 4A illustrate a first scenario where the developer provides no input for the randomization of his or her application, and FIGS. 2B, 3B, and 4B illustrate another scenario, where the developer provides more input for the randomization of his or her application. FIGS. 2C, 3C, and 4C illustrate yet another exemplary scenario, where the developer provides even more input for the randomization of his or her application.

Turning to FIG. 2C, in block 205, a developer writes an application 191 to be submitted to the application distribution entity 110 for distribution. The developer in block 215 identifies the gadgets in the code of the application 191. In block 230, the developer designates these (or some of these) gadgets as a set of blocks the application distribution entity may alter. For possible techniques for performing blocks 215/230, see the Vasilis Pappas references cited above. In block 235, the developer outputs a set of alternatives for each block as supplemental material. This provides the developer with more control over which blocks can be randomized and how the individual blocks are randomized. The developer in block 240, having previously obtained a valid certificate, signs the application and the supplemental material to create multiple developer digital signatures 133. In particular, each individual block of the set of blocks may have a signature 133. Note also that each gadget designated as a block may also be signed. In block 245, the developer (and the developer device 121) submits the original application 191, supplemental material, and their corresponding signatures to the application distribution entity 110.

As can be seen, this flow has the most control (relative to FIGS. 2A and 2B) by the developer over the randomization of the developer's application 191. However, this also requires the most work by the developer.

FIG. 3C corresponds to FIG. 2C and illustrates actions performed by the application distribution entity 110. In block 340, the application distribution entity 110 receives the original application 191, a set of alternatives for some blocks, and signatures 133 for the individual blocks and the original application 191. The application distribution entity 110 may store the application on one or more server(s). In block 345, the application distribution entity 110, for each block, randomly selects one option from the set of valid alterations. It is noted that some blocks may only contain one option as per the set of alternatives for those blocks. It is also noted that the original gadget may also be selected. It is further noted that if there are n code components (e.g., in the set of blocks that have corresponding possible alterations) designated by the developer, the application distribution entity 110 can select all n code components for randomization or less than n code components (but should select at least one of the n components). The application distribution entity 110 in block 350 generates a new, randomized version of the application by combining the randomly selected blocks.

In block 355, it is determined if the signature scheme supports aggregation. If the signature scheme does not support aggregation (block 355=No), in block 365, the application distribution entity 110 returns the set of signatures for the randomly selected blocks. Meanwhile, if the signature scheme does support aggregation (block 355=Yes), in block 360, the application distribution entity 110 generates an aggregate signature from the signature(s) over the randomly selected blocks. As an example, if there are n code components (e.g., in the set of blocks that have corresponding possible alterations) in the randomized version, the aggregate digital signature can be calculated over the n code components. The aggregate signature is for the entire randomized application 196. It is noted that the distribution entity 110 should provide a developer signature for each block used in the randomized version. There could be eight out of 10 blocks that are randomized, but a signature for the remaining two of 10 blocks still should be passed (e.g., via an aggregate signature or set of signatures) to the user device. The original code (the gadget) for a block will be signed and is a valid candidate for a block to use in the randomized version. In block 368, the application distribution entity 110, upon request by the user device, sends the randomized application 196 and signatures 198 to the user device. The signatures 198 include either the aggregate signature from block 360 or the set of signatures from block 365 (for altered parts of the code) and also the developer signature 133 (for the unaltered parts of the code).

FIG. 4C corresponds to FIGS. 2C and 3C. In block 405, the user device 120 requests an application and signature from the application distribution entity 110. The user device 120 in block 445 receives the randomized application 196 and signatures 198 from the application distribution entity 110. In block 410, the user device 120 determines whether it has been instructed to execute this application. If not (block 410=No), the flow proceeds to block 410. If so (block 410=Yes), the user device 120 in block 450 determines whether the signature scheme supports aggregation.

If the signature scheme does not support aggregation (block 450=No), the user device 120 in block 455 verifies the application was signed by a valid developer and only the application distribution entity has made alterations to the application. In block 460, the user device 120 verifies validity of the set of signatures for the randomly assigned blocks. In this case, there would be one signature per block of code. It is also possible to have the distribution entity sign the collection of signatures that indicates "here is the set that I am sending you". That would prevent some attacks where different users can compare their applications and "build new versions". Additionally, in one example, the user device would verify both the altered and unaltered portions of the application. Abstractly, parts of the code that the distribution entity cannot change can be considered as "alterable" regions with no alternatives. For any gadget G, one can imagine that one has at least two options: G=>{G, G'}. The developer would sign both G and G', and the original gadget G could be used in the randomized application, and would be verified. Block G' may also be used. Additionally, the unaltered parts of the application would also be verified (using a signature provided by the application distribution entity 110, e.g., a developer signature 133 attesting to the unaltered part of the code).

It is also noted there would typically be one signature for each block, regardless of whether or not it has been altered. One could, however, use one signature to cover all of these blocks easily. It should be easy for one skilled in the art to figure out how.

If the signature scheme does support aggregation (block 450=Yes), the user device 120 in block 465 verifies the application was signed by a valid developer and only the application distribution entity has made alterations to the application. For verifying that only the application distribution entity has made alterations to the allocation, by verifying the signatures, this is verification no other alterations have been made. In block 468, the user device 120 verifies the validity of the aggregate signature.

In block 420, it is determined by the application distribution entity 110 if the application is verified by both of blocks 455 and 460 (without aggregation) or both blocks 465 and 468 (with aggregation). If the application is not verified (block 420=No), blocks 430 and 433 are performed, as previously described. If the application is verified (block 420=Yes), in block 425, the user device 120 executes the randomized application 196.

It is noted that blocks 450-468 are performed in response to an instruction to execute the application 196. These blocks could be performed at points other than where they are indicated as being performed, as described above.

As previously described, the application distribution entity 110 may allow one, two or all three of the scenarios in FIGS. 2A-2C to be used by developers. FIG. 3D assumes that the application distribution entity 110 allows all three scenarios to occur, and the application distribution entity 110 chooses between the different scenarios based on what is received from a developer. Similarly, the user device 120 may require one of these scenarios to be used or may allow two or more of these scenarios to be used. FIG. 4D assumes that the user device 120 allows all three scenarios to occur, and the user device 120 chooses between these scenarios based on what is received from the application distribution entity 110.

For FIG. 3D, the application distribution entity 110 in block 370 receives information 369 from the developer (and the developer device 121). If that information 369-1 is an application and a signature for the application, the application distribution entity 110 performs FIG. 3A in block 371. If that information 369-2 is an application, a mask, and signatures for the application and mask, the application distribution entity 110 performs FIG. 3B in block 373. If that information 369-3 is an application, a set of alternatives, and signatures for the application and signatures for the set of alternatives for the alterable parts of the code, the application distribution entity 110 performs FIG. 3C in block 375.

In FIG. 4C, the user device 120 in block 470 receives information 469 from the application distribution entity 110. If that information 469-1 is an application, a patch file, and signatures, the user device 120 performs FIG. 4A in block 471. If that information 379-2 is an application, a mask (or its inverse), and signatures, the user device 120 performs FIG. 4B in block 473. If that information 469-3 is an application and a set of signatures for the altered parts of the code and a developer signature for the unaltered portion of the code or an aggregate signature, the user device 120 performs FIG. 4C in block 475.

Figures 5, 6:
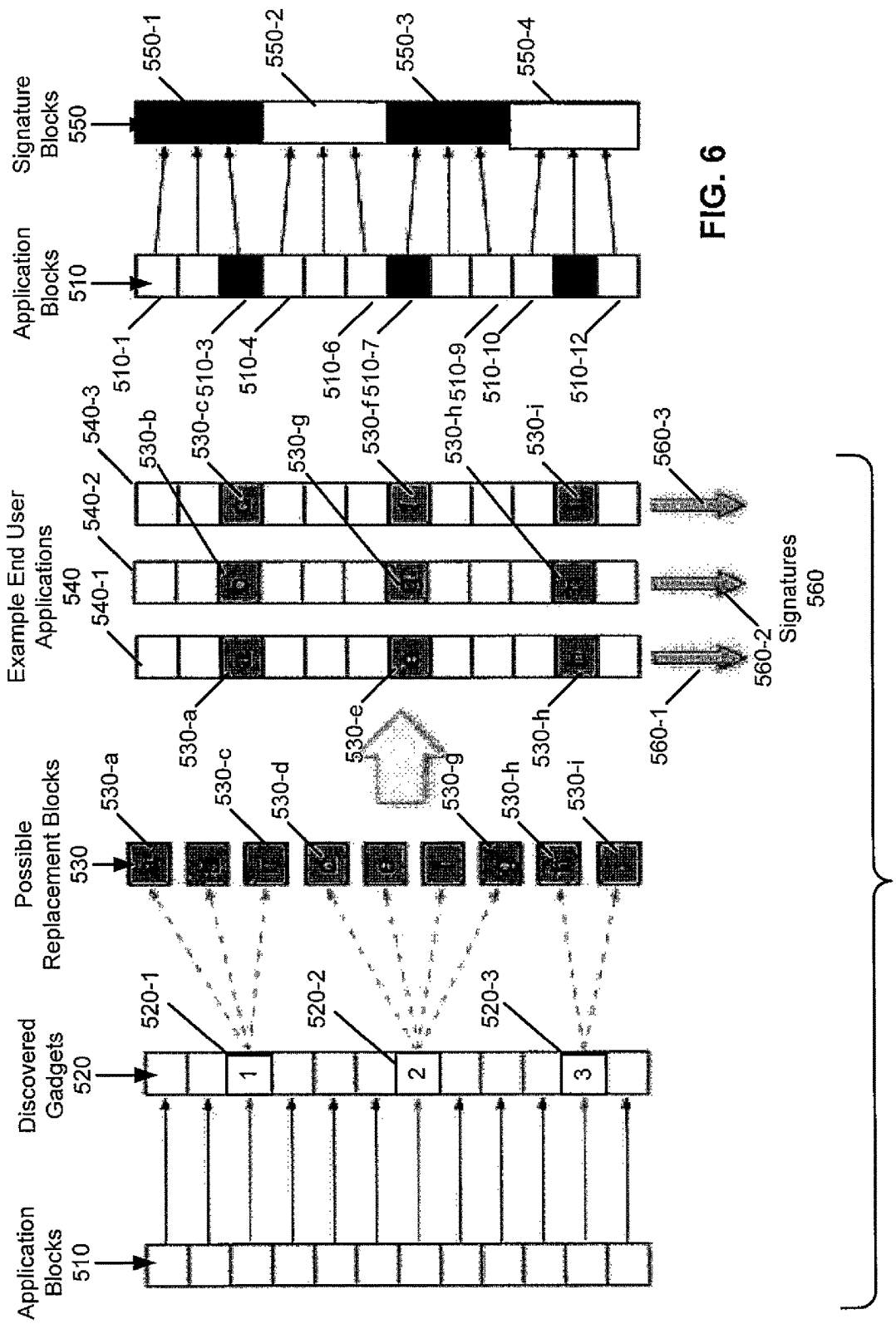
FIG. 5 is an example illustrating how application blocks and gadgets might be used to create multiple applications.
FIG. 6 is an example illustrating application and signature block granularity.

Turning to FIG. 5, this is an example illustrating how application blocks and gadgets might be used to create multiple applications. In block 308 of FIG. 3A and block 325 of FIG. 3B, the application distribution entity 110 analyzes the application to identify possible attack points (e.g., using gadgets) for a return oriented programming attack. These locations and possible randomizations of these gadgets may be stored, e.g., for creation of a new randomized application 196. Parts of these blocks are illustrated in reference to FIG. 5.

Example application blocks 510 are shown in FIG. 5, along with examples of the discovered gadgets 520, which in this example are gadgets 520-1, 520-2, and 520-3. The discovered gadgets may be considered to be the possible attack points and their corresponding gadgets 520.

The randomizations of these gadgets 520 are also illustrated by the possible replacement blocks 530, where the replacement blocks 530-$a$ through 530-$c$ can replace and are functionally equivalent to the gadget 520-1; the replacement blocks 530-$d$ through 530-$g$ can replace and are functionally equivalent to the gadget 520-2; and the replacement blocks 530-$h$ and 530-$i$ can replace and are functionally equivalent to the gadget 520-3. The possible randomizations are also illustrated by the example end user applications 540, which show example applications 540-1, 540-2, and 540-3. In this example, the application distribution entity 110 also generates an individual digital signature 560 for each application 540: digital signature 560-1 corresponds to application 540-1; digital signature 560-2 corresponds to application 540-2; and digital signature 560-3 corresponds to application 540-3. The application 540-1 uses the possible replacement blocks 530-$a$, 530-$e$, and 530-$h$ in the locations for the discovered gadgets 520-1, 520-2, and 520-3, respectively. The application 540-2 uses the possible replacement blocks 530-$b$, 530-$g$, and 530-$h$ in the locations for the discovered gadgets 520-1, 520-2, and 520-3, respectively. The application 540-3 uses the possible replacement blocks 530-$c$, 530-$f$, and 530-$i$ in the locations for the discovered gadgets 520-1, 520-2, and 520-3, respectively. For this example, there are 24 (=3*4*2) possible end user applications. This will be exponential in the number of gadgets that can be augmented. Because of this, it is expected that the application distribution entity 110 and not the developer should sign each application 540. In this example, the original gadget is replaced with a replacement block. This is not strictly necessary, however. For instance, an end user application could have the original gadget 520-1 but have the gadgets 520-2 and 520-3 replaced.

As described above, in blocks 215, 230, and 235 of FIG. 2C, the developer can designate code blocks and a set of valid alterations for each block and also output the sets. For instance, the developer may designate (block 230 of FIG. 2C) the gadget 520-1 as a block the application distribution entity 110 may alter, and also designate (block 235 of FIG. 2) possible replacement code blocks 530-$a$, 530-$b$, and 530-$c$ as a set of code blocks that may be used for alteration of gadget 520-1. Similar operations could be performed for gadgets 520-2 (for replacement code blocks 530-$d$ through 530-$g$) and 520-3 (for replacement code blocks 530-$h$ and 530-$i$).

Referring to FIG. 6, this figure is an example illustrating application and signature block granularity. This figure illustrates that the application block granularity and the signature block granularity might not match. For instance, the signature block 550-1 may correspond to application blocks 510-1 through 510-3; the signature block 550-2 may correspond to application blocks 510-4 through 510-6; the signature block 550-3 may correspond to application blocks 510-7 through 510-9; and the signature block 550-4 may correspond to application blocks 510-10 through 510-12. The example in FIG. 6 tries to limit the number of signatures that are needed. So, the block 520-1 (or 510-3), if this is left as it is or replaced with a, b, or c, this will always be preceded by the same two blocks (510-1 and 510-2), a larger signature can be used there, as illustrated by signature block 550-1. This technique is not required, however, and other techniques may be used.

Figure 7:
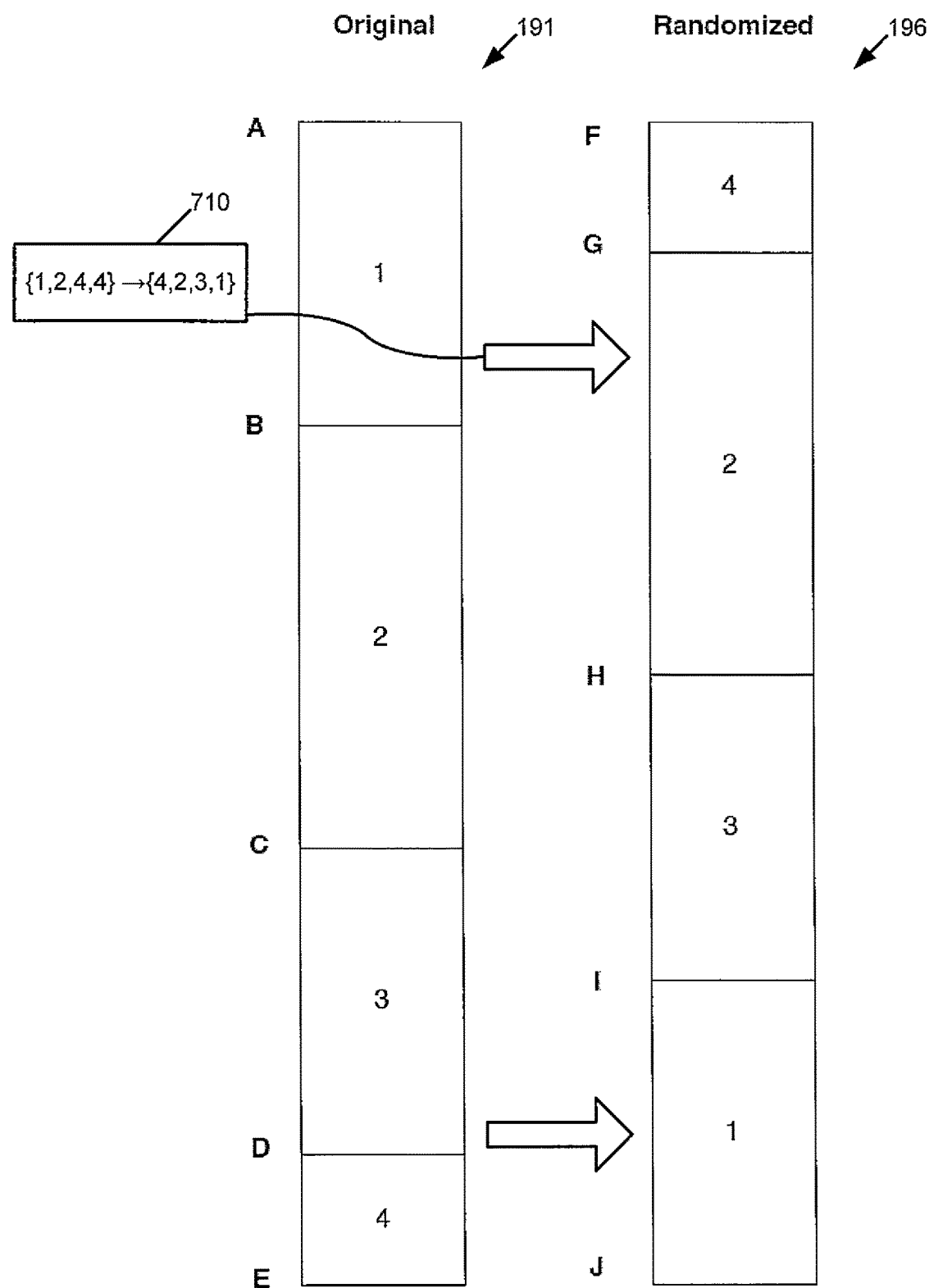
FIG. 7 is an example illustrating possible movement of code in an exemplary embodiment.

The above examples concern modifying code without moving code. However, it may be possible to also move code. For instance, FIG. 7 illustrates an example of possible movement of code in an exemplary embodiment. A layout of four sections of code for an original application 191 is shown on the left side, and the four sections are ordered from top to bottom as {1,2,3,4} or {(A:B), (B:C), (C:D), (D:E)}. A layout of four sections of code for a randomized application 196 is shown on the right side, and the four sections are ordered from top to bottom as {4,2,3,1} or {(F:G), (G:H), (H:I), (I:J)}.

In more detail, one possible solution to allow for code to be moved might be to produce and sign a "relocation mapping". Basically, the relocation mapping indicates how to reorder the blocks of code in memory. The signature of the blocks in their original location can be verified, because when the signature is computed, this is done by reading the mapping first, and then reading the blocks in the order that the mapping specifies.

The mapping 710 indicates that blocks {1,2,3,4} should be mapped to {4,2,3,1}. Other ways to represent this mapping 710 is as follows: {1→(I:J), 2→(G:H), 3→(H:I), 4→(F:G)} or {(A:B)→(I:J), (B:C)→(G:H), (C:D)→(H:I), (D:E)→(F:G)}. The original code 191 may be signed by performing Sign (A:B ☐ B:C ☐ C:D ☐ D:E), and the randomized application 196 may be verified using Verify (I:J ☐ G:H ☐ H:I ☐ F:G). Note that the mapping 710 itself could also be signed and verified. It is noted that in the actual execution of the randomized application, execution starts at I and proceeds to J, then G, H, F, G, as this is the same as starting at A, the proceeding to B, C, D, and E.

It should be noted that any description above or in the claims regarding receiving or sending information can occur via multiple times or messages or at a single time (e.g., in a single message).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   randomizing by a computer system portions of code in an original application to generate a randomized version of the original application, wherein the randomizing does not modify expected behavior of the original application;
   generating by the computer system one or more digital signatures that attest to integrity of the portions of code that have been randomized in the randomized version; and
   sending by the computer system the one or more digital signatures and one or more additional digital signatures that attest to originality of the application with a developer and sending either the original application or the randomized version of the original application to a user device for execution or denial of execution of the randomized version of the original application based on the one or more digital signatures and the one or more additional digital signatures.

2. The method of claim 1, wherein randomizing portions of code comprises one or both of the following:
   replacing portions of the code of the original application with other portions of code; and
   moving certain portions of the code from original locations in the original application to new locations in the randomized version.

3. The method of claim 1, wherein:
   generating a randomized version of an original application further comprises generating a modification file using the original application, the modification file indicating how to randomize the portions of the code in the original application to generate the randomized version of the original application; and
   sending either the original application or the randomized version of the original application to the user device further comprises sending the original application to the user device; and
   the method further comprises sending the modification file to the user device.

4. The method of claim 3, wherein:
   the method further comprises receiving a digital signature from a developer attesting to integrity of the original application;
   generating one or more digital signatures comprises generating a digital signature attesting to integrity of the modification file;
   sending the one or more digital signatures further comprises sending the digital signature attesting to the integrity of the modification file to the user device; and
   the method further comprises sending the digital signature from the developer to the user device as an additional digital signature.

5. The method of claim 1, wherein:
   randomizing portions of code in an original application to generate a randomized version of the original application further comprises randomizing portions of the code in the original application based on a mask from a developer indicating which portions of code in the original application may be altered, and randomizing only those portions of the code indicated as being alterable, wherein some or all of those portions of the code indicated as being alterable are randomized;
   sending either the original application or the randomized version of the original application to the user device further comprises sending the randomized application to the user device; and
   the method further comprises sending the mask to the user device.

6. The method of claim 5, wherein:
   generating one or more digital signatures comprises generating a digital signature attesting to integrity of the mask and an additional digital signature attesting to the integrity of the randomized application; and
   sending the one or more digital signatures further comprises sending the digital signature attesting to the integrity of the mask to the user device and sending the additional digital signature attesting to the integrity of the randomized application to the user device.

7. The method of claim 1, wherein:
   randomizing portions of code in an original application to generate a randomized version of the original application further comprises randomizing portions of the code in the original application based on information from a developer indicating certain portions of the code and indicating alterations for those certain portions of code that may be used to replace those certain portions of the code, wherein the randomizing randomly selects between the certain portions of the code and corresponding alterations of the certain portions of the code, for some of all of the certain portions of the code, to create altered portions of code;
   sending either the original application or the randomized version of the original application to the user device further comprises sending the randomized version of the original application to the user device.

8. The method of claim 7, wherein:
   generating one or more digital signatures comprises generating an aggregate digital signature at least from digital signatures for the altered portions of the code, wherein the aggregate digital signature is for the entire randomized version of the original application; and
   sending the one or more digital signatures further comprises sending the aggregate digital signature to the user device.

9. The method of claim 7, wherein:
   generating one or more digital signatures comprises determining a set of digital signatures from digital signatures for at least the altered portions of the code; and
   sending the one or more digital signatures further comprises sending the set of digital signatures and a signature attesting to unaltered portions of the code to the user device.

10. The method of claim 1, wherein:
    the method further comprises:
    analyzing the original application to identify possible attack points in the portions of the code for a return oriented programming attack;
    storing locations and possible randomizations of the portions of code that could be attacked; and
    randomizing is performed in response to a user's requesting the original application and uses the stored locations and possible randomizations.

11. The method of claim 1, wherein the randomizing, generating, and sending are performed for a plurality of users, randomized versions of the original application are different for each of multiple ones of the plurality of users, and wherein the different randomized versions are one of unique to each of the plurality of users or not unique to each of the plurality of users.

12. The method of claim 1, wherein operations performed by the randomizing, generating, and sending depend on which one of the following is received: the original application and a digital signature from a developer attesting to integrity of the original application; the original application, a mask, and a digital signature from a developer attesting to integrity of the original application, and a digital signature for the mask; or the original application, information from a developer indicating certain portions of the code and indicating alterations for those certain portions of code that may be used to replace those certain portions of the code, digital signatures for the certain portions of the code and the corresponding alterations, and a digital signature from the developer attesting to integrity of unaltered portions of the application.

13. A method, comprising:
receiving by a computer system one of an original application or a randomized version of the original application, one or more digital signatures corresponding to the randomized version of the original application, and one or more additional digital signatures that attest to originality of the application with a developer, wherein the one or more digital signatures corresponding to the randomized version of the original application ostensibly attest to integrity of portions of code that have been randomized in the randomized version of the original application;
creating, in response to the randomized version of the original application not being received, the randomized version;
verifying originality of the application with the developer using the one or more additional digital signatures;
verifying, by the computer system and by using the one or more digital signatures, the randomized version of the application; and
executing by the computer system the randomized version of the original application in response to the one or more digital signatures and the one or more additional digital signatures being verified or not executing the randomized version of the original application in response to the one or more digital signatures or the one or more additional digital signatures not being verified.

14. The method of claim 13, wherein the randomized version of the original application has had one or both of the following performed:
portions of the code of the original application replaced with other portions of code; and
certain portions of the code have been moved from original locations in the original application to new locations in the randomized version.

15. The method of claim 13, wherein:
receiving one of an original version of an application or a randomized version of the original application comprises receiving the original version of the application;
the method further comprises receiving a modification file, the modification file indicating how to randomize the portions of the code in the original application to generate the randomized version of the original application; and
creating the randomized version of the original application further comprises creating the randomized version of the original application using the modification file.

16. The method of claim 15, wherein:
receiving one or more digital signatures further comprises receiving a digital signature attesting to integrity of the modification file;
receiving one or more additional digital signatures comprises receiving a digital signature attesting to integrity of the original application;
verifying originality of the application with the developer using the one or more additional digital signatures comprises: verifying the original application using the digital signature attesting to the integrity of the original application;
verifying, by using the one or more digital signatures, the randomized version of the original application comprises:
verifying the modification file using the digital signature attesting to integrity of the modification file; and
considering the randomized version of the original application to be verified only if both the original application and the modification file are verified; and
in response to the randomized version of the original application being considered to be verified, performing the creating of the randomized version of the original application, wherein applying the modification file is performed before executing the randomized version of the original application.

17. The method of claim 13, wherein:
receiving one of an original version of an application or a randomized version of the original application comprises receiving the randomized version of the application;
the method further comprises receiving a mask, the mask indicating which portions of code in the original application have been altered to generate the randomized version of the original application;
receiving one or more digital signatures further comprises receiving a digital signature attesting to integrity of the mask and a digital signature from the distribution entity attesting to the integrity of the randomized application;
verifying, by using the one or more digital signatures, the randomized version of the original application further comprises:
verifying the randomized version of the original application using the digital signature attesting to integrity of the randomized version of the original application;
verifying the mask using the digital signature attesting to integrity of the mask; and
considering the randomized version of the original application to be verified only if both the randomized version of the application and the mask are verified.

18. The method of claim 13, wherein:
receiving one of an original version of an application or a randomized version of the original application comprises receiving the randomized version of the original application;
receiving one or more digital signatures corresponding to the randomized version of the original application further comprises receiving an aggregate digital signature attesting to integrity of the randomized version of the original application;
verifying, by using the one or more digital signatures, the randomized version of the original application further comprises:
verifying changes to the randomized version of the original application using the digital signature attesting to the integrity of the randomized version of the application; and considering the randomized version of the original application to be verified only if the changes are verified.

19. The method of claim 13, wherein:
receiving the randomized version of the original application comprises receiving the randomized version of the original application;
receiving one or more digital signatures corresponding to the randomized version of the original application further comprises receiving a set of digital signatures attesting to integrity of a corresponding plurality of blocks of code that have been randomized and receiving a signature attesting to unaltered portion of code;
verifying, by using the one or more digital signatures, the randomized version of the original application further comprises:
verifying changes to the original application using the set of digital signatures attesting to the integrity of the corresponding plurality of blocks of code that have been randomized;
verifying the signature attesting to the unaltered portion of code; and
considering the randomized version of the original application to be verified if the changes are verified.

20. The method of claim 13, wherein operations performed by the receiving, creating, verifying, and executing depend on which one of the following is received:
the original application, a modification file, a digital signature from a developer attesting to integrity of the original application, and a digital signature attesting to integrity of the modification file;
the randomized version of the original application, a mask, a digital signature from a developer attesting to integrity of the randomized application after the application of the mask, and a digital signature for the mask; or
the randomized version of the original application, and one of an aggregate digital signature attesting to integrity of the randomized version of the application or a set of digital signatures attesting to integrity of a corresponding plurality of blocks of code that have been randomized and a signature attesting to an unaltered portion of the code.

21. The method of claim 13, further comprising reporting to one or more of a user, an application distribution entity, and a developer that the randomized version of the original application was not verified.

22. The method of claim 13, wherein executing further comprises executing by the computer system the randomized version of the original application in response to the one or more digital signatures being verified and the developer's certificate is not revoked or not executing the randomized version of the original application in response to either the one or more digital signatures not being verified or the developer's certificate is revoked.

23. An apparatus, comprising:
one or more processors and one or more memories including computer program code, wherein one or more memories and the computer program code are configured to, with the one or more processors, cause the apparatus to perform at least the following:
randomizing by a computer system portions of code in an original application to generate a randomized version of the original application, wherein the randomizing does not modify expected behavior of the original application;
generating by the computer system one or more digital signatures that attest to integrity of the portions of code that have been randomized in the randomized version; and
sending by the computer system the one or more digital signatures and one or more additional digital signatures that attest to originality of the application with a developer and sending either the original application or the randomized version of the original application to a user device for execution or denial of execution of the randomized version of the original application based on the one or more digital signatures and the one or more additional digital signatures.

24. A computer program product comprising a computer readable storage medium having program instructions embodied therewith, the program instructions executable by a computer system to cause the computer system to perform at least the following:
randomizing by a computer system portions of code in an original application to generate a randomized version of the original application, wherein the randomizing does not modify expected behavior of the original application;
generating by the computer system one or more digital signatures that attest to integrity of the portions of code that have been randomized in the randomized version; and
sending by the computer system the one or more digital signatures and one or more additional digital signatures that attest to originality of the application with a developer and sending either the original application or the randomized version of the original application to a user device for execution or denial of execution of the randomized version of the original application based on the one or more digital signatures and the one or more additional digital signatures.

\* \* \* \* \*